US007533044B2

(12) United States Patent
Scott

(10) Patent No.: US 7,533,044 B2
(45) Date of Patent: May 12, 2009

(54) SYSTEM FOR SALE OF CONSUMER GOODS

(75) Inventor: Nicholas Arthur Scott, Minden (DE)

(73) Assignee: Vensafe ASA, Gressvik (NO)

( * ) Notice: Subject to any disclaimer, the term of this patent is extended or adjusted under 35 U.S.C. 154(b) by 1198 days.

(21) Appl. No.: 10/141,022

(22) Filed: May 7, 2002

(65) Prior Publication Data

US 2003/0163407 A1 Aug. 28, 2003

(30) Foreign Application Priority Data

| Feb. 22, 2002 | (NO) | ................................... | 20020893 |
| Feb. 25, 2002 | (NO) | ................................... | 20020905 |
| Apr. 10, 2002 | (NO) | ................................... | 20021679 |

(51) Int. Cl.
*G06Q 40/00* (2006.01)
(52) U.S. Cl. .............................. 705/35; 705/65; 705/66; 705/67
(58) Field of Classification Search .................... 705/35, 705/38, 65, 66, 67, 17, 41; 235/381, 383
See application file for complete search history.

(56) References Cited

U.S. PATENT DOCUMENTS

| 3,824,544 | A | 7/1974 | Simjian |
| 4,767,917 | A | 8/1988 | Ushikubo |
| 5,091,713 | A | 2/1992 | Horne et al. |
| 5,431,250 | A | 7/1995 | Schlamp |
| 5,499,707 | A | 3/1996 | Steury |
| 5,769,269 | A | 6/1998 | Peters |
| 5,902,984 | A | 5/1999 | Planke |
| 5,933,814 | A | 8/1999 | Rosenberg |

| 6,101,483 | A | 8/2000 | Petrovich et al. |

(Continued)

FOREIGN PATENT DOCUMENTS

WO WO 94/01838 1/1994

OTHER PUBLICATIONS

"Change at cage not just token gesture". John Grochowksi. Chicago Sun—Times. Chicago, Ill.: Jun. 30, 2002. p. 7.*

(Continued)

*Primary Examiner*—Lalita M Hamilton
(74) *Attorney, Agent, or Firm*—Rodman & Rodman

(57) ABSTRACT

A system for sale of consumer goods, the system including means for issuing to a customer from a printer a non-validated token representing an article of merchandise following election by the customer from a selection panel. The article is to be paid for by the customer at a check-out unit when checking the token at said unit. Said check-out unit has means for providing a validated token from a token printer or dispenser as a replacement token or by validating a reusable token. The validated token carries a transaction code elected from the group of: a serially generated transaction code or a randomly generated transaction code. Said checkout unit has means for communicating with an article dispenser means and providing the article dispenser means with said transaction code following payment of the article. The validated token is used for obtaining the bought article from the article dispenser means by means of comparator means within the article dispenser comparing the transaction code on the validated token as input to the comparator unit with the transaction code communicated by said communicating means, and delivery of the article upon a code match.

26 Claims, 1 Drawing Sheet

U.S. PATENT DOCUMENTS

| | | |
|---|---|---|
| 6,123,223 A | 9/2000 | Watkins |
| 6,193,154 B1 | 2/2001 | Phillips et al. |
| 6,281,886 B1 | 8/2001 | Raneri |
| 6,354,495 B1 * | 3/2002 | Powell ................. 235/380 |
| 6,393,339 B1 | 5/2002 | Yeadon |
| 6,439,345 B1 * | 8/2002 | Recktenwald et al. ......... 186/55 |
| 6,625,581 B1 | 9/2003 | Perkowski |
| 6,629,080 B1 | 9/2003 | Kolls |
| 6,954,732 B1 | 10/2005 | DeLapa et al. |
| 7,035,814 B2 * | 4/2006 | Malkin et al. ............. 705/23 |
| 7,114,650 B2 * | 10/2006 | Sherrod ................. 235/381 |
| 2001/0033752 A1 | 10/2001 | Cook et al. |
| 2001/0037207 A1 | 11/2001 | Dejaeger |
| 2002/0095343 A1 * | 7/2002 | Barton et al. ............. 705/16 |
| 2002/0097715 A1 | 7/2002 | Roerick |

OTHER PUBLICATIONS

"Electronic Welfare Payments Alter Check Casher's Role" Rodney Ho. Wall Street Journal. (Eastern edition). New York, N.Y.: May 13, 1997. p. B.2.*

"ATMs to scan for ID". Deborah Adamson Los Angeles Daily News. Journal Record. Oklahoma City, Okla.: Jan. 27, 1998. p. 1.*

* cited by examiner

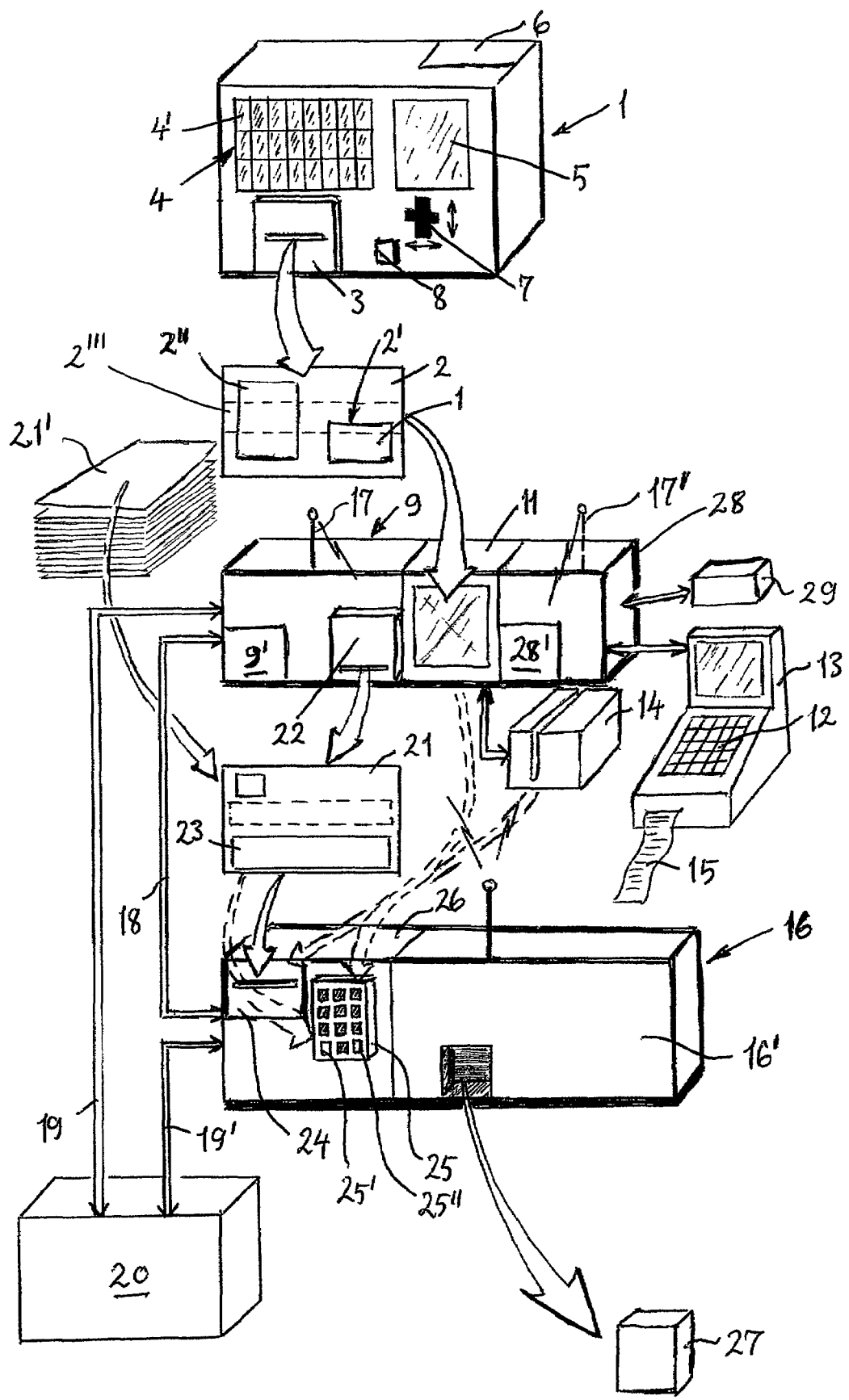

SYSTEM FOR SALE OF CONSUMER GOODS

The present invention relates to a system for sale of consumer goods, the system including means for providing or issuing to a customer a non-validated token representing an article of merchandise, said article to be paid for by the customer at a check-out unit when checking the token at said unit, said checkout unit having means for communicating with an article dispenser means and providing the article dispenser means with a first transaction code following payment of the article, and means for providing the customer with a validated token carrying a second transaction code, said validated token for use in obtaining the bought article from the article dispenser means by means of comparator means within the article dispenser means comparing the transaction code on the validated token as input to the comparator means with the transaction code communicated by said communicating means, and delivery of the article upon a defined code match.

A prior art system of this kind is known from U.S. Pat. No. 5,902,984, where the non-validated token carries both data related to the article number and a card serial number unique to that individual token. Such tokens are normally displayed on a rack where the customer may pick the token representing the article which the customer intends to purchase.

However, in the prior art system article numbers may change from time to time, due to amended type of a particular article, a new brand or a correction of the article serial number being made. This implies that that pre-issued, non-validated tokens on a rack may not be recognisable when taken to a control unit. Furthermore, frequent pre-printing and replacement of tokens are expensive operations.

The invention has therefore as one of it objects to provide a system which avoids these disadvantages, but still preserve the intended benefits of the prior art system, in addition to other novel features provided by the present invention.

According to the invention said means for providing the non-validated token is a printer controlled by a selection panel displaying articles for which a non-validated token can be printed upon activation thereof.

According to further features of the system, according to the invention, the non-validated token carries information related to the type of article. The type-of-article information is elected from the group of: numerical code, bar-code, EAN code, UPC-code, magnetically readable code, manually interpretable article identification.

In addition, the type-of-article information is electable from the group of: animation of the article, name of article, article price, a unique token number.

According to another feature of the system the unique token number is generated serially or randomly by said providing or issuing means.

Further, the validated token that carries a transaction code is elected from the group of:
 a serially generated transaction code,
 a randomly generated transaction code,
 a predetermined series of transaction codes, and
 said unique token number.

The transaction code provided on the validated token is elected from the group of: numerical code, bar-code, EAN code, UPC-code, magnetically readable code, rf-tag readable code, an array of numbers, an array of letters, an array of a combination of numbers and letters, at least one array of punched holes, programmable IC-chip, a pre-programmed IC-chip.

In a particular embodiment, the validated token is the non-validated token provided with the transaction code through processing in the check-out unit.

In a preferred embodiment, however, the validated token is a replacement token issued by the check-out unit from a dispenser, from a printer or from a supply of pre-made, non-alterable, re-usable, re-validatable and machine readable tokens.

The communication between the check-out unit and the article dispenser means may be on one or more of several forms, dependent on the installation facilities. Suitably the communication type is elected from the group of:
 ultrasonic transmission,
 electro-optical transmission,
 rf-transmission,
 blue-tooth transmission,
 hard-wired transmission,
 transmission via a retailer central computer unit and general goods transaction controller.

In a particular embodiment, the check-out unit is includes or is associated with a transaction code encoder means, the check-out counter further comprising a type-of-article-information scanner means, said scanner means for communicating said information to the encoder means, said check-out unit communicating with the article dispenser means via said token encoder means, said token encoder means relaying said information to a cash register in said check-out unit for processing in a payment collection operation, and said token encoder means further having a controller for controlling a printer issuing the validated article token, and means for conveying said communication to the article dispenser means.

The transaction code on the validated token is input to the comparator through machine reading of the transaction code, said machine elected from the group of:
 OCR reader,
 optical scanner for scanning a bar code or EAN code
 an electromagnetic magnetic strip reader
 an IC-chip reader,
 a punched holes reader,
 rf-tag code reader.

In an alternative to the machine reading, the article dispenser means has a manually operable keypad, keyboard or touch-screen for input to the comparator unit of a manually readable transaction code on the validated token.

The first and second transaction codes may be the same codes or the codes may be related to each other, e.g. as complementary codes, symmetrical codes or non-symmetrical codes.

The invention is now to be described with reference to the attached drawing.

The system has a unit 1 which provides or issues to a customer a non-validated token 2 from a printer 3 which is controlled by a selection panel 4 displaying articles for which the non-validated token can be printed upon activation of one of the panel elements 4', each element representing an article of merchandise. As an alternative, a selection panel in the form of a display panel 5, e.g. of LCD type, may show the various selectable articles stored in a memory 6. A cursor or marker two-way or four-way multifunction-switch 7 may be used in order that the customer can move a marker or cursor on the display panel and through push-down thereof or activation or a separate activator switch 8 may cause the desired article to be elected and a non-validated token to be printed by the printer. As a further alternative, the selection panel may be in the form of large dimension LCD-display or touch-screen.

The non-validated token 2 carries an information field 2' related to the type-of-article information 10. Such information 10 may be presented in a form on the token electable from the group of: numerical code, bar-code, EAN code, UPC-code, magnetically readable code, manually interpretable article identification. In addition, there may be provided on the token in a field 2" additional information elected from the group of: animation of the article, name of article, article price, a unique token number. If there is a unique token number provided on the token, the number can be generated serially or randomly by said unit 1.

The non-validated token 2 is then taken by the customer to a check-out unit 9 for checking the non-validated token 2 with regard to its type-of-article information or article code 10. This checking is suitably made through use of a conventional optical scanner 11 which permanently installed or hand-held. However it will of course be possible to read the article code manually and enter it through input via a keypad 12 on a cash register 13, or using a magnetic stripe reader (decoder) and encoder 14. When checking is carried out, the value of the article is added to the bill 15 issued from the cash register 13.

The checkout unit 9 has various means for communicating with an article dispenser means 16 to provide the article dispenser means with a transaction code following payment of the article. Such way of communication may be through one or more of the following: wireless transmission 17, 17' such as ultrasonic transmission, electro-optical transmission, rf-transmission, blue-tooth transmission; hard-wired transmission 18; and transmission 19, 19' via a combined retailer central computer and general merchandise transaction controller unit 20.

The customer may be provided with a validated token 21 printed from a dispenser or printer 22 on the check-out unit 9, said token 21 carrying a transaction code 23 being the same as or related to that communicated from the check-out-unit 9 to the article dispenser means 16.

Alternatively, it may be considered to re-use tokens which a) carry a transaction code unique to a particular token, b) have been processed in the article dispenser means and have become non-validated thereby, and c) are located in a supply of such non-validated tokens 21' irrespective of the order in which the transaction codes appear from one token to the next. Revalidation of re-usable tokens 21' can e.g. be made by scanning the transaction code on a token and relate that code to the transaction code communicated to the article dispenser means 16, the transaction code communicated to the article dispenser means in any event also having information added thereto related to the type and number of articles bought and paid, and consequently to be delivered to the customer upon presentation of a validated token 21.

Scanning of such token could be made optically if the re-usable token 21' carries an optically readable code, e.g. readable by said scanner 11. If based on magnetic stripe reading, the reader 14 could be used. It could also be envisaged using rf-tag technique for such re-usable tokens, however requiring an rf-tag code reader 29 at the check-out unit 9.

Irrespective of type of scanning required to read a code on a re-usable token 21', a token reader 24 inside the article dispenser means 16 must be capable of reading the code on the validated token 21 input to such reader. If an rf-tag technique is used, non-readability thereof of such rf-tag based token outside the dispenser means is required in order that the token has to be inserted into the reader, processed and retained by the dispenser means for later re-use.

The validated token 21 (e.g. based on a re-usable token, an originally issued token, or a replacement token) is used for obtaining the bought (and paid) article from the article dispenser means 16.

When a validated token 21 is inserted into the token reader 24 on the dispenser means 16, or when the transaction code 23 shown on the token 21 is input via a keypad 25, said keypad having in addition "cancel" key 25' and "enter" key 25", a comparator means 26 within the article dispenser means 16 compares the transaction code on the validated token as input to the comparator means 26 with the transaction code communicated by said communicating means. If there is a code match according the predetermined criteria, the dispenser means 16 delivers through the delivery part 16' thereof the article 27 to the customer.

The transaction code as communicated to the dispenser means 16 and as present on the validated token 21 is elected from the group of: a serially generated transaction code, a randomly generated transaction code, and said unique token number. Further, the transaction code provided on the validated token 21 is suitably elected from the group of: numerical code, bar-code, EAN code, PC-code, magnetically readable code, rf-tag readable code, an array of numbers, an array of letters, an array of a combination of numbers and letters, at least one array of punched holes, programmable IC-chip, a pre-programmed IC-chip.

However, it may also be visualized that validated token is in fact the non-validated token 2 provided with the transaction code through processing in the check-out unit 9. Such processing could e.g. be through using the magnetic encoder 14 to encode the magnetic stripe 2''' on the token 2. Alternatively, a person operating the check-out unit 9 could use the unique token number, if present, printed on the token 2 as a transaction number and manually enter it via the keypad 12.

However, most preferred, the validated token 21 is a replacement token issued by the printer or token dispenser 22.

It will be noted from the attached drawing that the check-out unit 9 is includes or is associated with a transaction code encoder means 28. As described above, the checkout unit 9 is associated said scanner 11, said scanner 11 capable of communicating the type-of-article information to the transaction code encoder means 28. Thus, it may in a particular embodiment be preferable to let said check-out unit 9 communicate with the article dispenser means 16 via said transaction encoder means 28, e.g. through wireless transmission 17'. The said encoder means 28 relays said information to the cash register 13 which communicates with the check-out unit 9 for processing in a payment collection operation to add-on to the bill 15. The encoder means 28 may further have a controller unit 28', similar to a controller unit 9' for controlling the printer 22 which issues the validated article token 21.

The token reader 24 may be of any selected type in order to enable reading in machine-readable form the transaction code provided on the validated token 21, thus e.g. a machine elected from the group of:

OCR reader, optical scanner for scanning a bar code or EAN code an electromagnetic magnetic strip reader an IC-chip reader, a punched holes reader, and rf-tag code reader.

If the validated token, either token 21 or the original, though later validated token 2, has a manually readable transaction code, e.g. an array of numbers, the manually operable keypad or keyboard 25 can be used to input to the comparator means 26 the transaction code on the validated token.

The invention claimed is:

1. A system for sale of consumer goods, the system comprising,
   an article token selection panel device activatable by a customer, the device displaying different articles of merchandise or representations thereof and including manually activatable selection means for selecting one of the different articles by a customer upon activation of the device,
   a printer controlled by the article token selection panel device for providing a customer with a non-validated token that corresponds to an article of merchandise selected by the customer, when the article token selection panel device is activated by the customer,
   the printer having means for printing the non-validated token with article identifying information for the article of merchandise selected by the customer upon activation of the article token selection panel device,
   a checkout unit for customer payment for the selected article when checking out the non-validated token at the checkout unit,
   an article dispensing device linked with the checkout unit via communication means, the checkout unit configured to provide the article dispensing device with a first transaction code following said payment for the selected article,
   means for providing the customer with a validated token following said payment, said validated token carrying a second transaction code, validated for use in obtaining the bought selected article from the article dispensing device,
   a comparator device at said article dispensing device for comparing the second transaction code on the validated token as input to the comparator device with the first transaction code communicated by the communication means from the checkout unit to the article dispensing device, and
   means in the article dispensing device for delivery of the bought selected article upon a defined code match between the first and second transaction codes,
   wherein the non-validated token carries information related to the type of article and wherein the type-of-article information is elected from the group of: numerical code, bar-code, EAN code, UPC-code, magnetically readable code, rf-tag readable code, manually interpretable article identification, and wherein the type-of-article information is in addition elected from the group of: animation of the article, name of article, article price, a unique token number, and wherein the unique token number is generated serially or randomly by the printer.

2. A system according to claim 1, wherein the second transaction code on the validated token is elected from the group of:
   a serially generated transaction code,
   a randomly generated transaction code,
   a predetermined series of transaction codes, and
   said unique token number.

3. A system according to claim 1, wherein the second transaction code provided on the validated token is elected from the group of: numerical code, bar-code, EAN code, UPC-code, magnetically readable code, rf tag readable code, an array of numbers, an array of letters, an array of a combination of numbers and letters, at least one array of punched holes, code provided to a programmable IC-chip, and code present on a pre-programmed IC-chip.

4. A system according to claim 1, wherein the communication between the check-out unit and the article dispenser means is elected from the group of:
   ultrasonic transmission,
   electro-optical transmission,
   rf-transmission,
   blue-tooth transmission,
   hard-wired transmission,
   transmission via a retailer central computer unit and general merchandise transaction controller unit.

5. A system according to claim 1, wherein the second transaction code on the validated token is input to the comparator means through machine reading of the transaction code, said machine elected from the group of:
   OCR reader,
   optical scanner for scanning a bar code or EAN code
   an electromagnetic magnetic strip reader
   an IC-chip reader,
   a punched holes reader, and
   rf-tag code reader.

6. A system according to claim 1, wherein the article dispenser means has a manually operable keypad, keyboard or touch-screen for input to the comparator means of a manually readable transaction code on the validated token.

7. A system according to claim 1, wherein the first transaction code communicated to the article dispenser means and the second transaction code provided on the validated token are the same codes or codes related to each other, as complementary codes, symmetrical codes or non-symmetrical codes.

8. A system according to claim 1, wherein the selection panel is a touch-screen.

9. A system for sale of consumer goods, the system comprising,
   an article token selection panel device activatable by a customer, the device displaying different articles of merchandise or representations thereof and including manually activatable selection means for selecting one of the different articles by a customer upon activation of the device,
   a printer controlled by the article token selection panel device for providing a customer with a non-validated token that corresponds to an article of merchandise selected by the customer, when the article token selection panel device is activated by the customer,
   the printer having means for printing the non-validated token with article identifying information for the article of merchandise selected by the customer upon activation of the article token selection panel device,
   a checkout unit for customer payment for the selected article when checking out the non-validated token at the checkout unit,
   an article dispensing device linked with the checkout unit via communication means, the checkout unit configured to provide the article dispensing device with a first transaction code following said payment for the selected article,
   means for providing the customer with a validated token following said payment, said validated token carrying a second transaction code, validated for use in obtaining the bought selected article from the article dispensing device,
   a comparator device at said article dispensing device for comparing the transaction code on the validated token as input to the comparator device with the first transaction code communicated by the communication means from the checkout unit to the article dispensing device, and means in the article dispensing device for delivery of the bought selected article upon a defined code match between the first and second transaction codes, wherein the validated token is the nonvalidated token provided with the transaction code through processing in the check-out unit.

10. A system according to claim 9, wherein the second transaction code provided on the validated token is elected from the group of: numerical code, bar-code, EAN code, UPC-code, magnetically readable code, rf tag readable code, an array of numbers, an array of letters, an array of a combination of numbers and letters, at least one array of punched holes, code provided to a programmable IC-chip, and code present on a pre-programmed IC-chip.

11. A system according to claim 9, wherein the second transaction code on the validated token is input to the comparator means through machine reading of the transaction code, said machine elected from the group of:
OCR reader,
optical scanner for scanning a bar code or EAN code
an electromagnetic magnetic strip reader
an IC-chip reader,
a punched holes reader, and
rf - tag code reader.

12. A system according to claim 9, wherein the article dispenser means has a manually operable keypad, keyboard or touch-screen for input to the comparator means of a manually readable transaction code on the validated token.

13. A system according to claim 9, wherein the first transaction code communicated to the article dispenser means and the second transaction code provided on the validated token are the same codes or codes related to each other, as complementary codes, symmetrical codes or non-symmetrical codes.

14. A system according to claim 9, wherein the selection panel is a touch-screen.

15. A system for sale of consumer goods, the system comprising,
an article token selection panel device activatable by a customer, the device displaying different articles of merchandise or representations thereof and including manually activatable selection means for selecting one of the different articles by a customer upon activation of the device,
a printer controlled by the article token selection panel device for providing a customer with a non-validated token that corresponds to an article of merchandise selected by the customer, when the article token selection panel device is activated by the customer,
the printer having means for printing the non-validated token with article identifying information for the article of merchandise selected by the customer upon activation of the article token selection panel device,
a checkout unit for customer payment for the selected article when checking out the non-validated token at the checkout unit,
an article dispensing device linked with the checkout unit via communication means, the checkout unit configured to provide the article dispensing device with a first transaction code following said payment for the selected article,
means for providing the customer with a validated token following said payment, said validated token carrying a second transaction code, validated for use in obtaining the bought selected article from the article dispensing device,
a comparator device at said article dispensing device for comparing the transaction code on the validated token as input to the comparator device with the first transaction code communicated by the communication means from the checkout unit to the article dispensing device, and
means in the article dispensing device for delivery of the bought selected article upon a defined code match between the first and second transaction codes, wherein the validated token is a replacement token issued by the check-out unit from a token dispenser, from a token printer or from a supply of pre-made, non-alterable, re-usable, re-validatable and machine readable tokens.

16. A system according to claim 15, wherein the second transaction code provided on the validated token is elected from the group of: numerical code, bar-code, EAN code, UPC-code, magnetically readable code, rf tag readable code, an array of numbers, an array of letters, an array of a combination of numbers and letters, at least one array of punched holes, code provided to a programmable IC-chip, and code present on a pre-programmed IC-chip.

17. A system according to claim 15, wherein the second transaction code on the validated token is input to the comparator means through machine reading of the transaction code, said machine elected from the group of:
OCR reader,
optical scanner for scanning a bar code or EAN code
an electromagnetic magnetic strip reader
an IC-chip reader,
a punched holes reader, and
rf-tag code reader.

18. A system according to claim 15, wherein the article dispenser means has a manually operable keypad, keyboard or touch-screen for input to the comparator means of a manually readable transaction code on the validated token.

19. A system according to claim 15, wherein the selection panel is a touch-screen.

20. A system for sale of consumer goods, the system comprising,
an article token selection panel device activatable by a customer, the device displaying different articles of merchandise or representations thereof and including manually activatable selection means for selecting one of the different articles by a customer upon activation of the device,
a printer controlled by the article token selection panel device for providing a customer with a non-validated token that corresponds to an article of merchandise selected by the customer, when the article token selection panel device is activated by the customer,
the printer having means for printing the non-validated token with article identifying information for the article of merchandise selected by the customer upon activation of the article token selection panel device
a checkout unit for customer payment for the article when checking out the non-validated token at the checkout unit,
an article dispensing device linked with the checkout unit via communication means, the checkout unit configured to provide the article dispensing device with a first transaction code following said payment for the selected article,
means for providing the customer with a validated token following said payment, said validated token carrying a second transaction code, validated for use in obtaining the bought selected article from the article dispensing device,
a comparator device at said article dispensing device for comparing the transaction code on the validated token as input to the comparator device with the first transaction code communicated by the communication means from the checkout unit to the article dispensing device, and means in the article dispensing device for delivery of the bought selected article upon a defined code match between the first and second transaction codes, wherein the check-out unit includes or is associated with a transaction code encoder means, the check-out counter further comprising a type-of-article- information scanner means, said scanner means for communicating said information to the encoder means, said check-out unit communicating with the article dispenser means via said encoder means, said encoder means relaying said information to a cash register in said check-out unit for processing in a payment collection operation, and said encoder means further having a controller for controlling a printer issuing the validated article token, and means for conveying said communication to the article dispenser means.

21. A system according to claim 20, wherein the second transaction code on the validated token is elected from the group of:
   a serially generated transaction code,
   a randomly generated transaction code,
      a predetermined series of transaction codes, and
      said unique token number.

22. A system according to claim 20, wherein the second transaction code provided on the validated token is elected from the group of: numerical code, bar-code, EAN code, UPC-code, an array of numbers, an array of letters, and an array of a combination of numbers and letters.

23. A system according to claim 20, wherein the second transaction code on the validated token is input to the comparator means through machine reading of the transaction code, said machine elected from the group of:
   OCR reader; and,
   optical scanner for scanning a bar code or EAN code.

24. A system according to claim 20, wherein the article dispenser means has a manually operable keypad, keyboard or touch-screen for input to the comparator means of a manually readable transaction code on the validated token.

25. A system according to claim 20, wherein the first transaction code communicated to the article dispenser means and the second transaction code provided on the validated token are the same codes or codes related to each other, as complementary codes, symmetrical codes or non-symmetrical codes.

26. A system according to claim 20, wherein the selection panel is a touch-screen.

* * * * *